Feb. 23, 1926.  1,574,419

G. H. DICKERSON

BOARD DRESSING MACHINE

Filed Jan. 17, 1923   8 Sheets-Sheet 1

Inventor
Glenn H. Dickerson
By Frank E. Liverance
Attorney.

Feb. 23, 1926.

G. H. DICKERSON

BOARD DRESSING MACHINE

Filed Jan. 17, 1923

Inventor
Glenn H. Dickerson
By Frank E. Liverance, Jr.
Attorney.

Feb. 23, 1926.

G. H. DICKERSON
BOARD DRESSING MACHINE
Filed Jan. 17, 1923

Inventor
Glenn H. Dickerson
By Frank E. Liverance, Jr.
Attorney

Feb. 23, 1926.

G. H. DICKERSON

BOARD DRESSING MACHINE

Filed Jan. 17, 1923

Inventor
Glenn H. Dickerson
By Frank E. Liverance Jr.
Attorney.

Inventor
Glenn H. Dickerson
By Frank E. Liverance, Jr.
Attorney.

Feb. 23, 1926.

G. H. DICKERSON

BOARD DRESSING MACHINE

Filed Jan. 17, 1923   8 Sheets-Sheet 7

Inventor
Glenn H. Dickerson
By Frank E. Liverance, Jr.
Attorney.

Feb. 23, 1926.
G. H. DICKERSON
1,574,419
BOARD DRESSING MACHINE
Filed Jan. 17, 1923
8 Sheets-Sheet 8
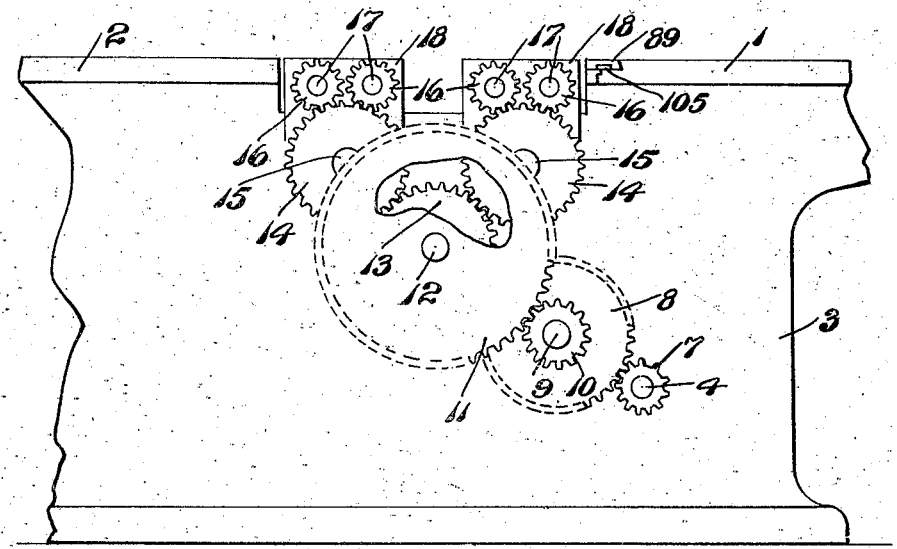
Fig. 14.
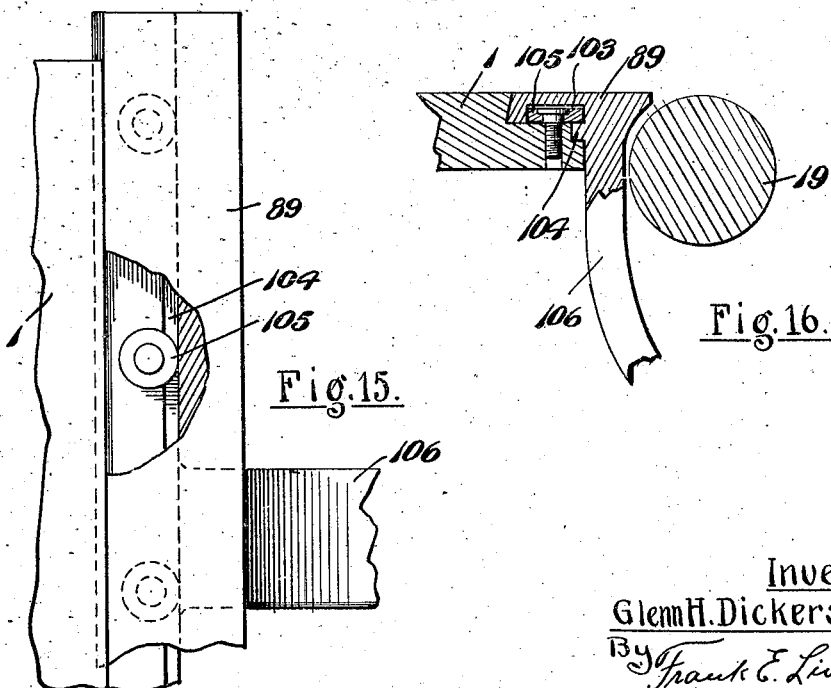
Fig. 15.
Fig. 16.
Inventor
Glenn H. Dickerson
By Frank E. Liverance, Jr.
Attorney.

Patented Feb. 23, 1926.

1,574,419

UNITED STATES PATENT OFFICE.

GLENN H. DICKERSON, OF GRAND RAPIDS, MICHIGAN, ASSIGNOR OF ONE-THIRD TO DE FOREST HAMILTON AND ONE-THIRD TO HENRY RIECHEL, BOTH OF GRAND RAPIDS, MICHIGAN.

BOARD-DRESSING MACHINE.

Application filed January 17, 1923. Serial No. 613,162.

*To all whom it may concern:*

Be it known that I, GLENN H. DICKERSON, a citizen of the United States of America, residing at Grand Rapids, in the county of Kent and State of Michigan, have invented certain new and useful Improvements in Board-Dressing Machines; and I do hereby declare the following to be a full, clear, and exact description of the invention, such as will enable others skilled in the art to which it appertains to make and use the same.

This invention relates to what is known as a glue joiner machine, being particularly concerned with a machine which dresses or shapes the opposite edges of boards for subsequent gluing and joining of the boards together. The present invention has for its primary object and purpose, a machine in which boards may be fed, one after the other and, irrespective of the widths of the boards fed into the machine, within limits prescribed by the machine, dressed or shaped at its opposite longitudinal edges simultaneously so that the board may then have glue applied to said dressed or shaped edges and brought into contact with like edges of other boards and clamped together for firmly securing the boards together in a single width. The invention comprises many novel constructions and arrangements of parts for effectively accomplishing this end, as will fully appear with understanding of the invention embodied in the construction which is illustrated in the accompanying drawings, in which, Fig. 1 is a plan of the machine of my invention.

Fig. 14 is a fragmentary elevation of the rear side of the machine.

Fig. 15 is a fragmentary plan view with parts broken away and in section, showing the slide mount at the rear edge of the front table section, and Fig. 16 is a transverse vertical section therethrough.

Like reference characters refer to like parts in the different figures of the drawings.

Figure 1:
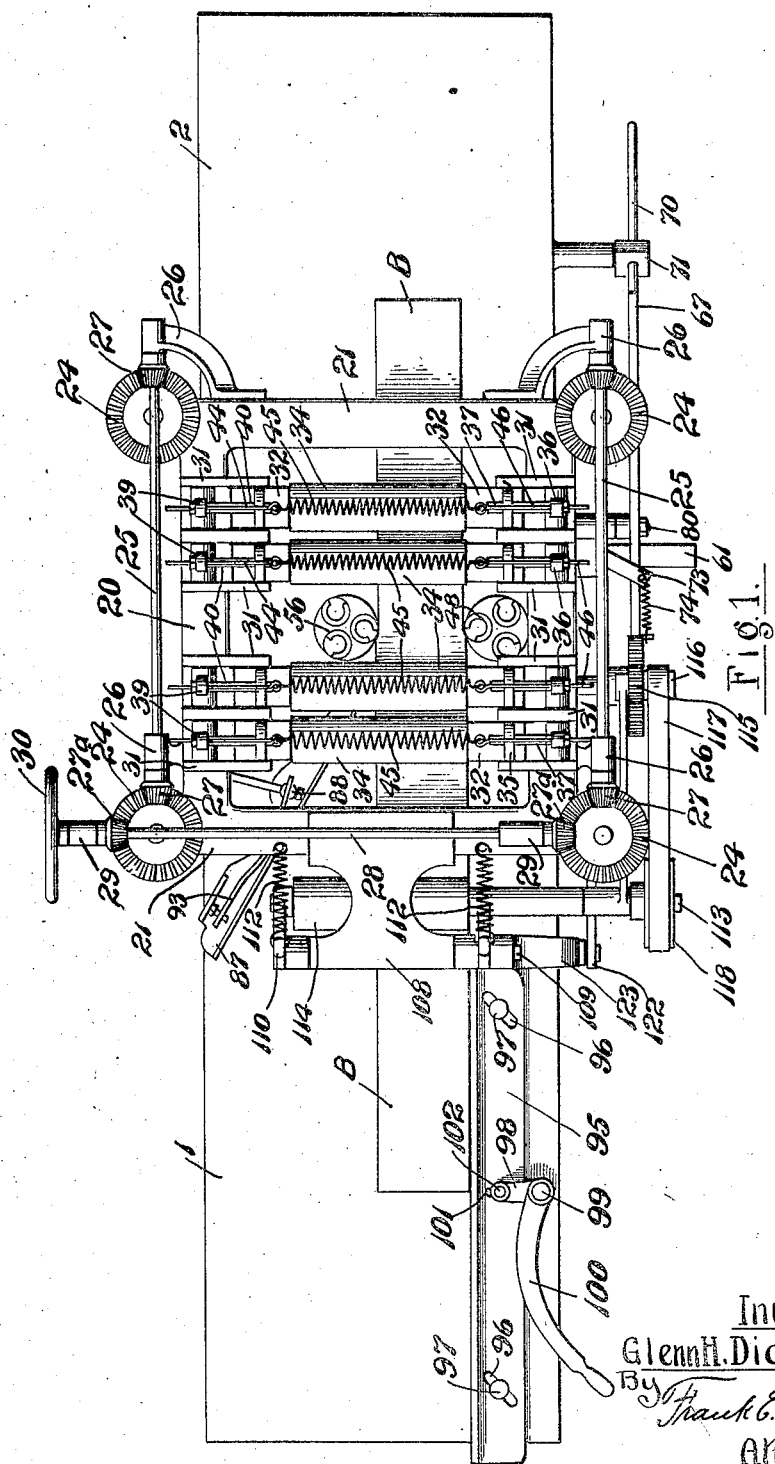
Figure 2:
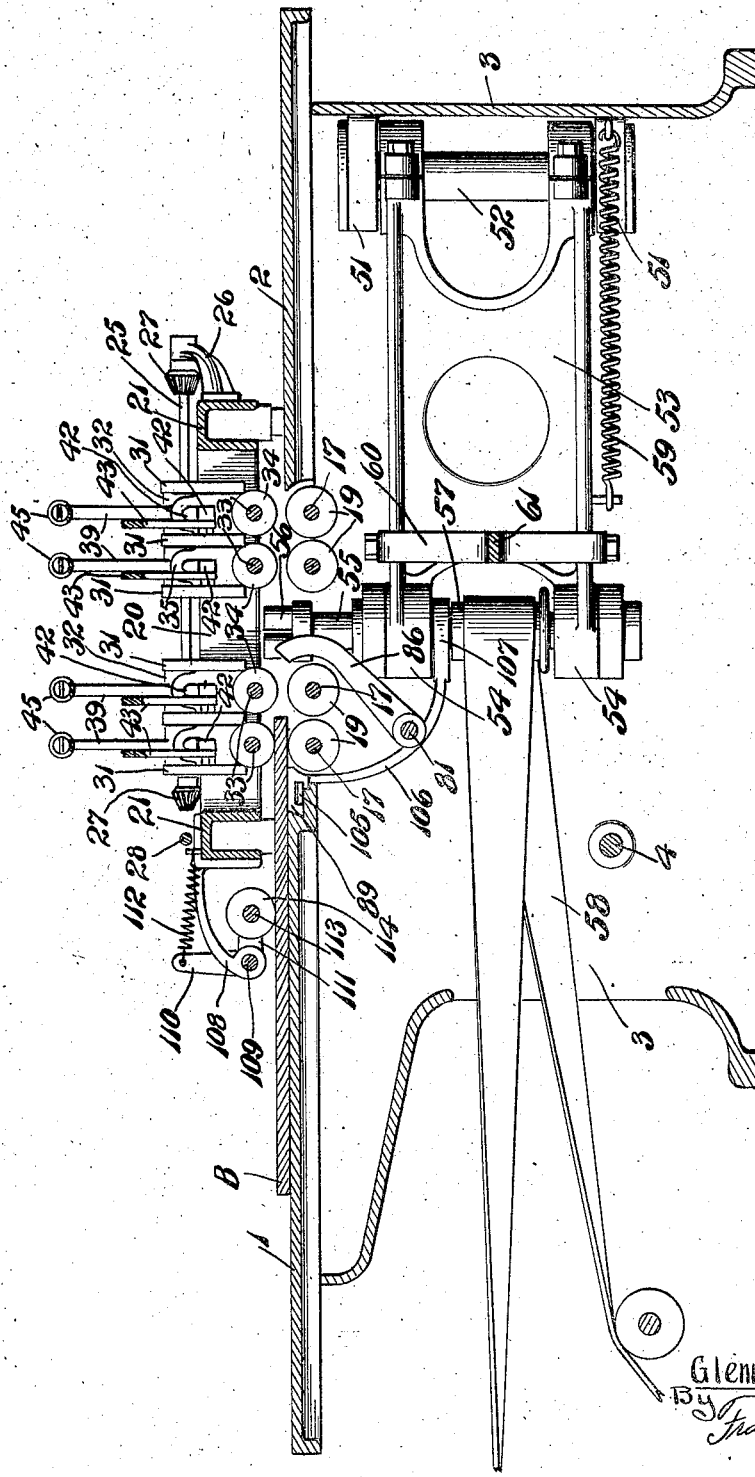
Fig. 2 is a longitudinal vertical section therethrough.

In the construction two horizontal tables 1 and 2 are supported in alinement on an under frame 3. The table 1 is at what may be termed the front of the machine and table 2 is spaced a distance from the rear edge of the front table. A horizontally located drive shaft 4 passes through the sides of the frame 3, at one end being equipped with a drive pulley 5 adapted to be driven from any suitable source of power by a belt 6.

A pinion 7 is secured at the opposite end of the drive shaft and engages with a gear 8 mounted on a stud shaft 9 secured to the rear side of the frame. A pinion 10 connected with gear 8 drives a relatively large gear 11 mounted on a stud shaft 12, connected with which gear 11 is a smaller gear 13 meshing with and driving two gears 14 of equal size mounted on stud shafts 15, as shown. Each of the gears 14 meshes with and drives two pinions 16 secured on the ends of shafts 17 which extend across the frame between the adjacent edges of the tables 1 and 2 and are mounted at their ends in suitable bearings 18. A roller 19 is carried on each shaft 17. Two of the rollers are located close together at the rear edge of the front table 1 and the other two at the front edge of the rear table 2 and their upper points are in substantially the same horizontal plane with the upper sides of the tables. These rollers constitute driven feed rollers for the boards entered into the machine.

An open frame comprising two parallel sides 20 and two parallel ends 21 is located over the feed rollers, shafts 22 screw threaded at their lower ends to enter suitable interiorly threaded guides 23 passing through the corners of the frame downwardly into the guides which are permanently secured to the front and rear sides of the frame 3. Each shaft at its upper end is equipped with a bevelled gear 24. A shaft 25 is located above and lengthwise of each side 20 of the open frame, being rotatably carried in suitable brackets 26 attached to said open frame. Each shaft is equipped with a bevelled pinion 27 adjacent each end which is in mesh with the adjacent gear 24 immediately below. A third shaft 28 lies above one of the ends 21 of the open frame, being rotatably mounted in brackets 29 and is likewise equipped with bevelled pinions 27ª in mesh with the gears 24 below. One end of the shaft 28 has a hand wheel 30 fixed thereto. It is evident that on turning the hand wheel, the said open frame and members attached thereto may be raised or lowered with respect to the mechanism below it.

A pair of supporting bracket guides is secured to each side 20 of the open frame, each bracket including three parallel vertical guides 31 between which blocks 32 are mounted for vertical movements. The blocks serve as journals for the ends of cross shafts 33 on which rollers 34 are secured, one above each of the feed rollers 19. Each block 32 is formed with an integral upwardly extending eye member 35 having an opening therethrough.

Two bell-crank levers, each including a vertical arm 36 and an inwardly extending horizontal arm 37 are pivotally mounted at 38 on each of the bracket guides at the front side of the machine, there being four of the bell-crank levers at said front side. Similarly, an equal number of bell-crank levers are carried at the rear side. Each of the rear bell-crank levers includes a vertical arm 39 and an inwardly extending arm 40 and the same are pivotally mounted on and between the guides 31 at 41. Each of the arms 40 at its inner end is turned downwardly for a short distance, as indicated at 42.

A bar 43 is pivotally connected to each arm 36 of each bell-crank lever at the front side of the machine and extends across and downwardly to the lower end of the downturned portion 42 of the directly opposite bell-crank lever at the opposite side. Eye-rods 44 pass through the upper ends of the arms 36 and 39 of the directly opposite levers, being threaded at their outer ends to receive nuts, and a strong coiled spring 45 connects the said rods at their inner ends. This arrangement serves to cause the rollers 34 to be pressed downwardly through the force of the springs, and if one end of a roller is elevated with the passage of a board thereunder the opposite end is also elevated through the passage of the arms 37 and 40 through the openings in the eye members 35 on blocks 32. The arrangement is an equalizing device capable of elevating one end of the roller 34 when the opposite end is elevated and workable within the slight limits required in the machine.

At the front side of the frame 3, a heavy yoke 46 is secured having upper and lower arms and bearings therein for the rotatable mount of a vertical spindle 47, at the upper end of which a cutter head 48 is located. A drive pulley 49 is formed on the spindle and the same is driven by a belt 50 from any suitable source of power. This spindle is fixed except for its rotation and will hereafter be termed the fixed spindle and cutter.

Figure 7:
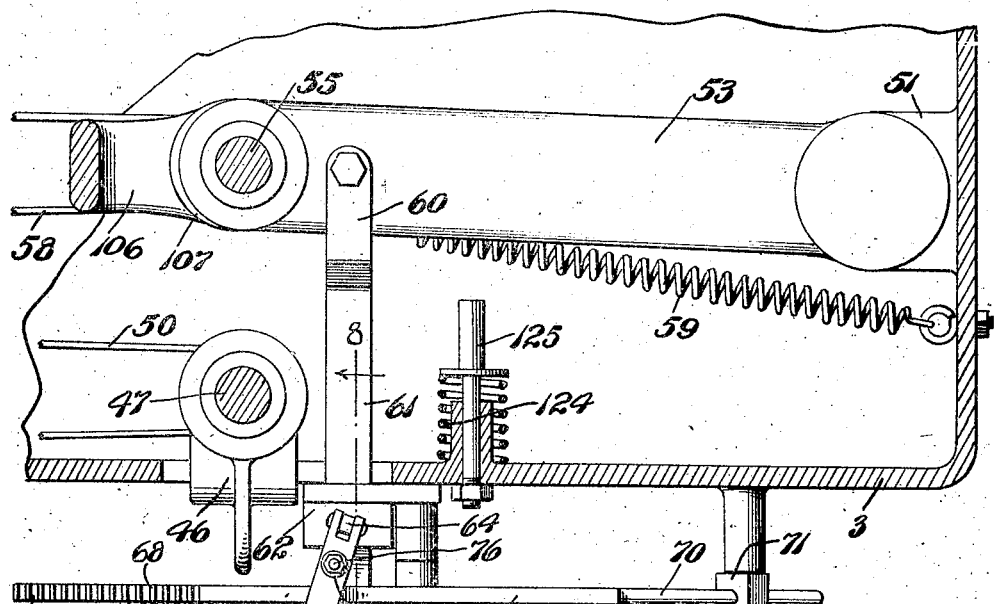
Fig. 7 is an enlarged fragmentary horizontal section through the machine at the front side and rear end of the same.
Figure 9:
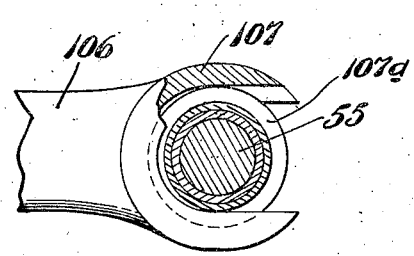
Fig. 9 is a fragmentary vertical section through the mount for the movable cutter spindle.

Between two lugs 51 projecting inwardly from the rear end of the frame 3, a heavy vertical shaft 52 is rotatably mounted on which a forwardly extending heavy arm 53 is secured, at its forward end terminating in two journal ears 54, one over the other in which a vertical spindle 55 is rotatably mounted, it being equipped with a cutter head 56 at its upper end. A drive pulley 57 is formed on the spindle and is driven by a belt 58 from any motor, line shafting or the like. The arm 53 is movable about the pivotal axis of shaft 52 and the spindle and cutter head carried at the forward inner end thereof may be moved to different positions relative to the other fixed spindle and cutter, being normally drawn toward the same through a spring 59 attached to arm 53 and the end of the frame 3, as shown in Fig. 7. The two spindles 47 and 55 lie one in front of the other and the two cutter heads 48 and 56 extend above the tables 1 and 2, lying between said tables and in substantially the same horizontal plane with each other.

Figure 8:
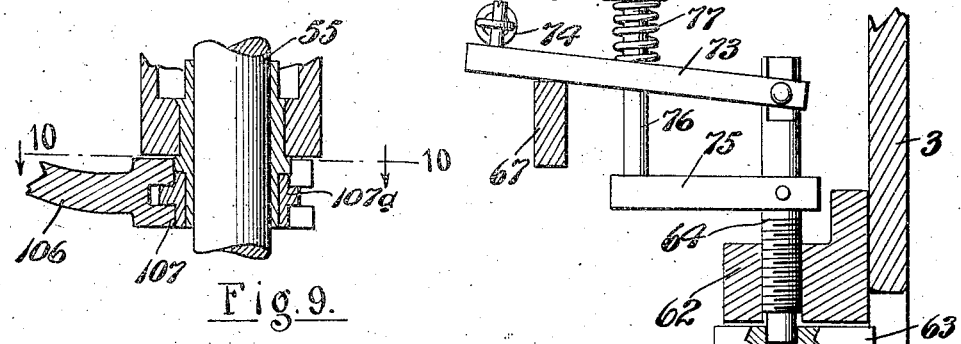
Fig. 8 is a fragmentary enlarged vertical section taken substantially on the plane of line 8—8, of Fig. 7.
Figure 10:
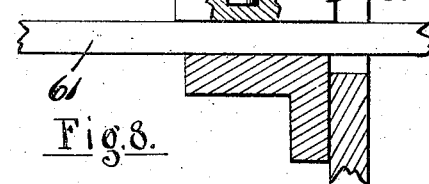
Fig. 10 is a horizontal section taken on the plane of line 10—10 of Fig. 9.

A yoke 60 at the inner end of a flat bar 61 is connected to the arm 53, the bar 61 extending horizontally through an opening in a block 62 connected to the back of the front side of the frame 3. A clamping block or bar 63 also lies in said opening in block 62 against the upper side of the bar 61, as shown in Fig. 8, and a screw 64 is threaded through the block 62 at its upper side to engage against the clamping member 63. A partial turn of the screw 64 serves to clamp the bar 61 securely in place against movement.

Figure 4:
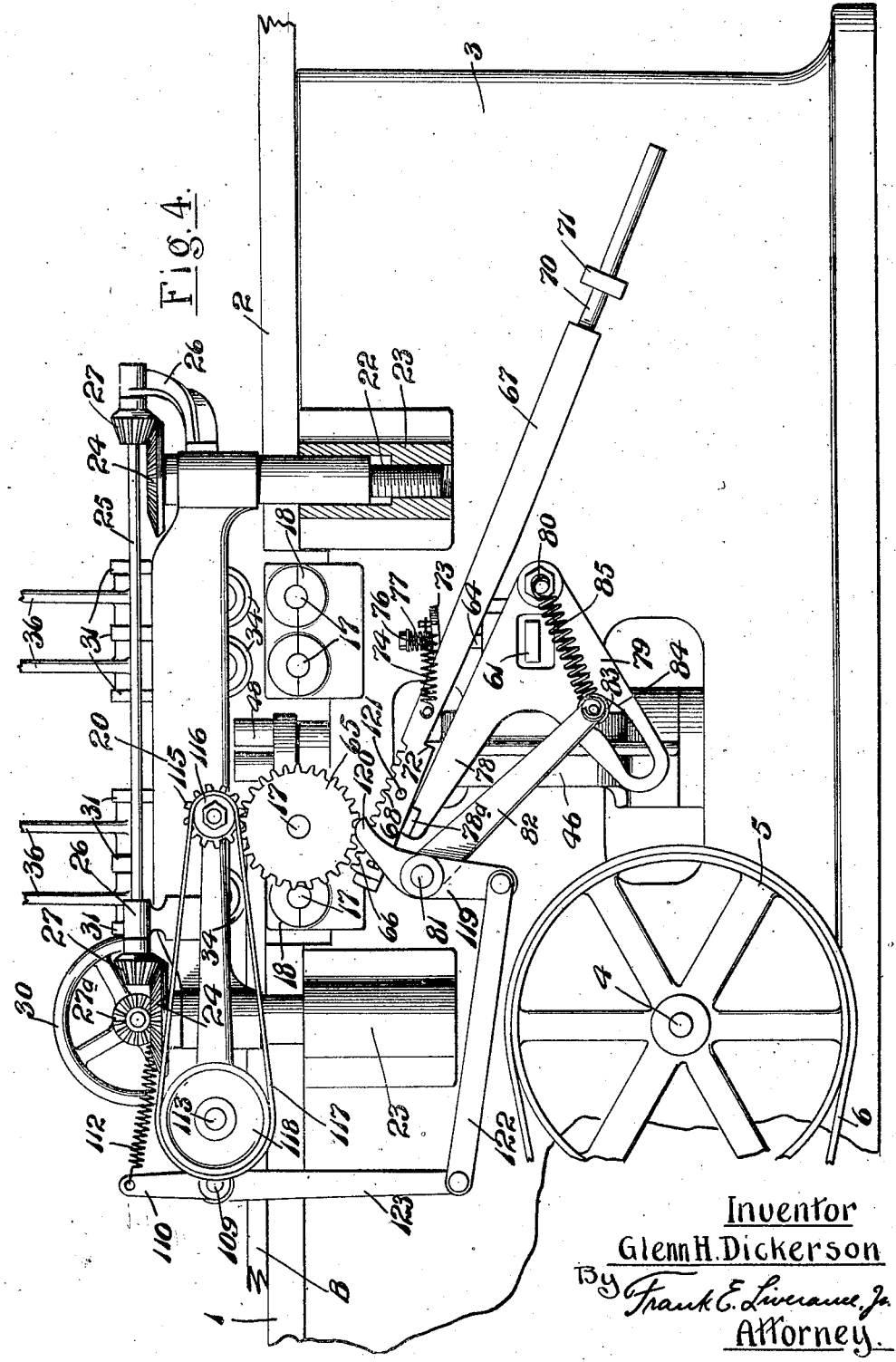
Fig. 4 is an enlarged fragmentary side elevation of the machine looking at what may be termed the front side of the machine.
Figure 5:
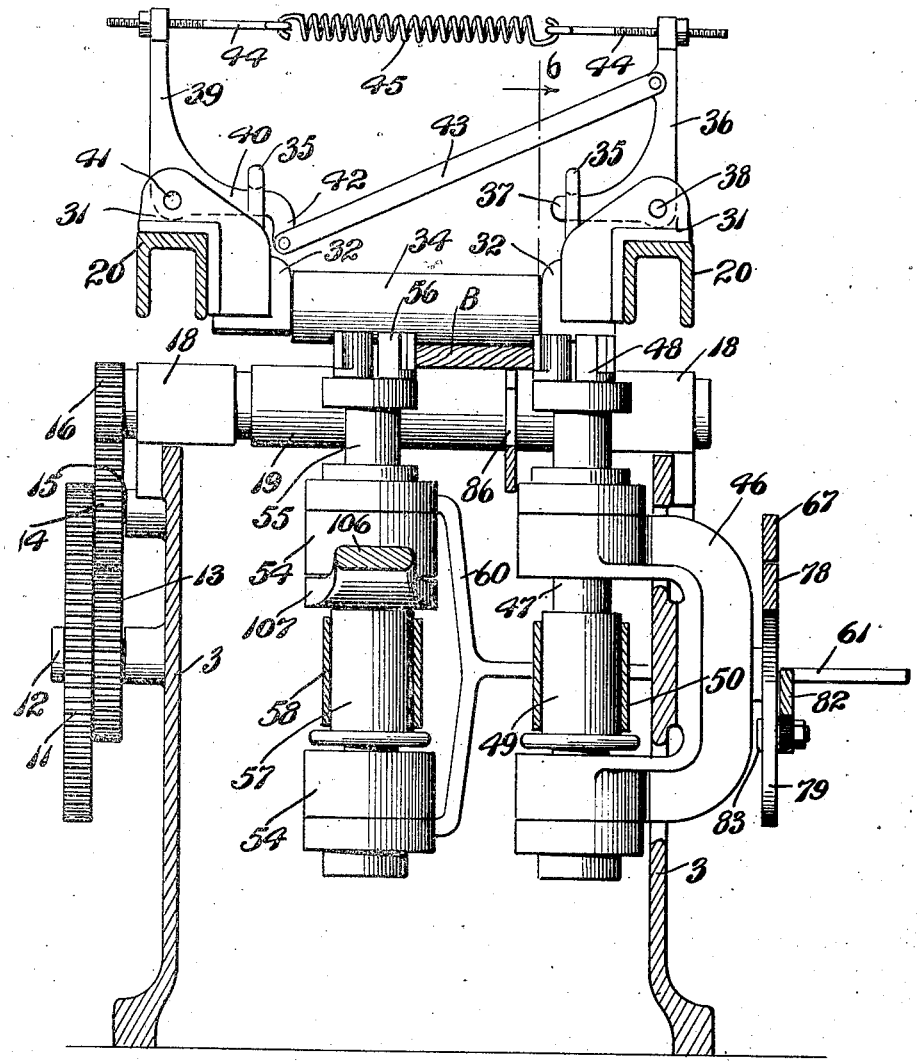
Fig. 5 is a vertical transverse section through the machine.
Figure 6:
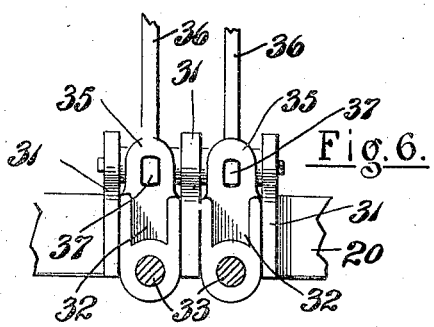
Fig. 6 is a fragmentary elevation and section, on the plane of line 6—6, of Fig. 5, looking in the direction indicated by the arrows.
Figure 13:
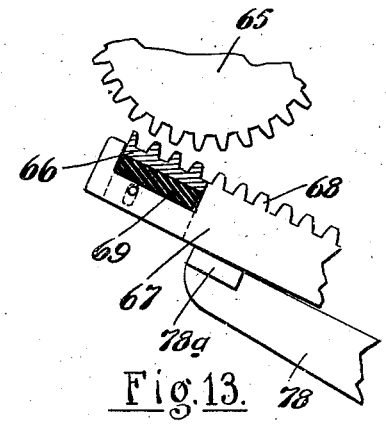
Fig. 13 is a fragmentary side elevation and section of a detail of construction of the lock operating mechanism.

At the front end of one of the shafts 17, as shown in Fig. 4, a gear 65 is secured, the same being located directly over a rack segment 66 which is mounted on the end of a bar 67 located in front of the front side of frame 3 inclining downwardly toward the rear end of the machine. The rack segment 66 is in alinement normally with additional rack teeth 68 cut in the upper edge of the bar near its upper end. The segment 66 is adjustably mounted on the bar, having depending sides 66$^a$ with a pin and slot connection with the bar and under the said segment a rubber cushion 69 is located, as shown in Fig. 13, so as to permit a slight downward movement of the segment if there should not be perfect mesh of the rack and gear 65 at the time of their engagement. At its lower end bar 67 is equipped with a rod 70 which has slidable mounting in a member 71 carried by the front side of the frame 3. The bar 67 has a section cut away from its lower edge so as to leave a recess at the upper end of which is a shoulder 72, as shown.

A bar 73 is pivotally connected to the upper end of the screw 64 and extends over and bears against the upper edge of bar 67, being provided with a pin 73$^a$ at its free end to which one end of a spring 74 is connected, the opposite end having connection to said bar 67. Forward movement of the bar 67 longitudinally serves to turn the screw 64 and tighten the clamping member 63 against bar 61, as is evident. A short bar 75 is connected to and extends from screw 64 under the bar 73 and a rod 76 attached to the end of the bar 75 extends upwardly through the said bar 73, carrying a nut 76$^a$ at its upper end, with a coiled spring 77 under compression between the nut and upper side of the bar 73. This spring has a tendency to hold the bar 67 down against the tendency of the spring 74 to elevate the same when it is tensioned as will later appear.

Directly under the forward upper portion of the bar 67 a bell-crank lever comprising two arms 78 and 79 is pivotally mounted at 80 on the front side of the supporting frame 3, the arm 78 extending upwardly and forwardly and at its end carrying a block 78$^a$ against which the under edge of bar 67 rests. A shaft 81 passes through the machine transversely a short distance in front of the end of arm 78, on the front end of which an arm 82 is fixed which extends downwardly to the arm 79, having a roller 83 at its free end which is received in a cam slot 84 cut in the arm. A spring 85 connects the end of arm 82 with the stationary pivot 80 of the bell-crank lever. On the shaft 81 a finger 86 is secured which normally, at its upper end interposes in the path of movement of the board, indicated at B, as it passes from the front pairs of rollers 19 and 34, moving it downwardly and rocking the shaft 81.

Figure 11:
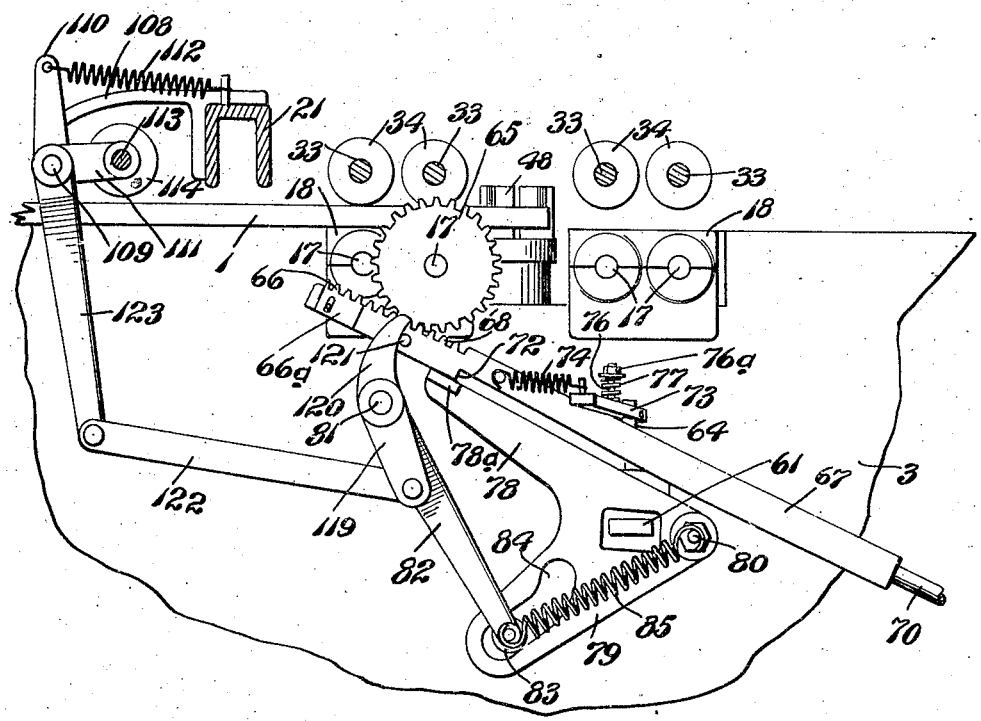
Fig. 11 is a fragmentary side elevation of the front side of the machine illustrating the position of the lock operating mechanism immediately after the entrance of a board to the cutters.
Figure 12:
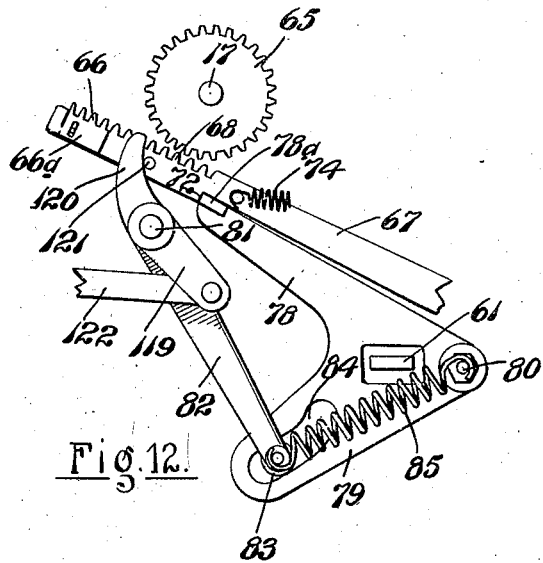
Fig. 12 is a like view of the lock operating mechanism at a slightly later stage of the operation.

This movement occurs as soon as the front end of the board comes to the finger 86, the rocking of the shaft 81 causes a movement of the arm 82 to the position shown in Fig. 11, whereupon the bell-crank lever is tilted to elevate the arm 78 and raise the rack segment 66 into engagement with the continuously rotating gear 65. This causes the bar 67 to be moved longitudinally until the shoulder at 72 passes beyond the block 78$^a$, on which the bar is forced downwardly by spring 77 and the block 78$^a$ seated behind the shoulder, or the parts occupy the position shown in Fig. 12. The rack is disengaged from the gear 65, and the clamping screw at 64 has been turned so as to lock the bar 61 against movement. The arm 53 and the movable spindle and cutter head carried thereby are thereby positively locked against movement away from the board while it is passing between the cutters and its edges are being dressed or shaped.

Figure 3:
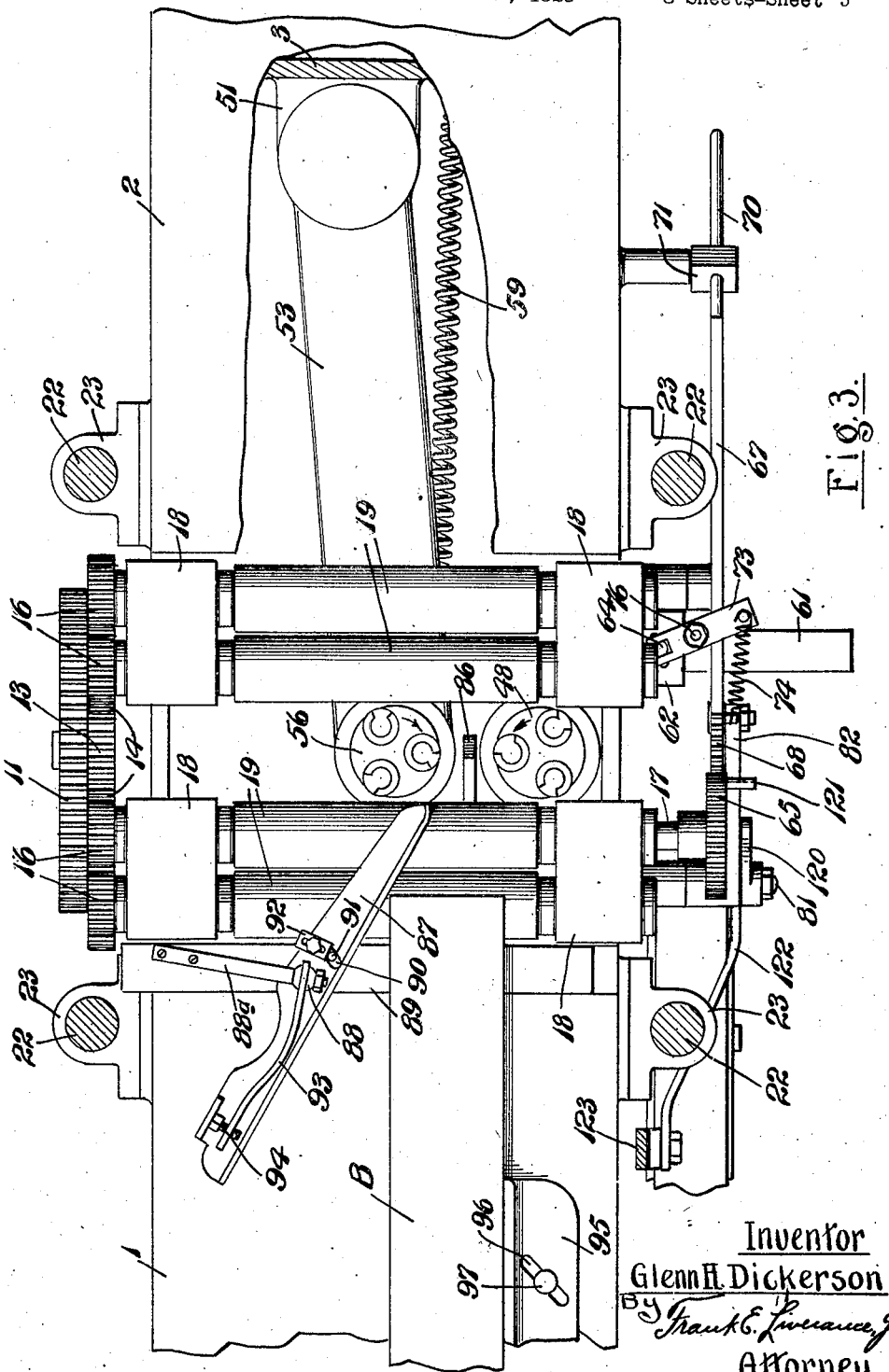
Fig. 3 is an enlarged fragmentary plan view, parts of the upper mechanism being removed and other parts shown in section for better disclosure of the mechanism.

It is necessary that the movable cutter be properly located with reference to the stationary cutter to dress or shape the edges of the boards, and as the boards are of different widths, this has to be done for each board entered into the machine. I have provided means for accomplishing this automatically. It is apparent that after the end of the board has passed the finger 86, said finger is released and the parts relating to the locking of the bar 60 come back to original position under the force of springs 112, as later described, freeing the arm 53 for movement. When the board is entered into the machine, its rear edge bears against a guide shoe 87 which is pivotally mounted between its ends at 88 on a slide bar 89 mounted for transverse sliding movements at the rear edge of the front table 1. This shoe has a short curved slot 90 therein, into which a pin 91 from the slide 89 extends. An adjustably mounted stop block 92 is carried by the shoe to limit its pivotal movement in one direction, and a leaf spring 93 attached at one end to the pivot post 88 and at its other end at 94 to the end of the shoe normally turns the shoe so as to bring the block 92 against the pin. A strengthening bar 88ª is connected to the pivot post 88 at one end and to the slide 89 at its other, as shown in Fig. 3.

To guide the board B into the machine at its opposite edge, an adjustably mounted guide bar 95 is carried on the upper side of the table 1 parallel with the front side edge, said bar having diagonally cut slots 96 therein through which headed pins 97 pass into the table. An arm 98 is pivotally mounted on a pin 99 carried by the table, and an operating arm or handle 100 is connected with the arm 98 so as to turn it. The free end of arm 98 extends over the bar 95 which is transversely slotted at 101 and a pin 102 extends from the end of arm 98 into the slot. By operating the handle 100, a longitudinal movement is given to the guide bar 95 and the same is moved transversely in or out by reason of the inclined slots at 96 bearing against the pins 97.

When the board is entered into the machine, with one edge against the guide bar 95, as soon as its opposite edge comes against the end of the shoe 87, it is turned slightly about the pivot post or until the pin 91 comes against the end of the slot 90, and thereafter the shoe and attached slide bar 89 move laterally. The bar is mounted for free sliding movement at the edge of the feed table 1, as shown in Figs. 15 and 16, the bar on its under side having a longitudinal groove 103 cut therein with a rib 104 extending under the groove and seating in a recess cut in the table to receive it. Rollers 105 are mounted on the table to enter the groove 103 whereby the slide bar is mounted for free anti-friction movement. An arm 106 is formed integral with the slide bar and extends downwardly and is curved to the rear, at its free end being formed with a yoke 107 which engages with a suitable collar 107ª on the spindle 55. The sliding movement of the slide bar is imparted to the arm 53 through this connection with the spindle and the cutter 56 is moved to the proper position with reference to the board that it will dress the edge thereof and remove no more than is necessary for the required dressing or shaping. As soon as this adjustment of the movable cutter to place has occurred, the end of the board strikes the finger 86 and starts the lock mechanism for the bar 61 in movement, almost instantly locking the cutter against movement away from the board until after the board has passed whereupon the lock is released, as previously described, and the cutter carrying arm 53 moved toward the front side of the machine by spring 59 so as to be ready for the action of the next board entered into the machine.

It is desirable that an auxiliary feed roller be used to engage against the upper side of the board to help its entrance between the rollers 19 and 34. A supporting bracket 108 is connected to the front end 21 of the open frame heretofore described and extends forward over the table 1 being turned downwardly at its free end toward the table. A rock shaft 109 is rotatably mounted at the end of the bracket and at each end the rock shaft is equipped with a bell-crank lever comprising a vertical arm 110 and a rearwardly extending horizontal arm 111, springs 112 being connected to the arms 110 and the end 21 of the open frame so as to normally move the arms 111 of the levers in a downward direction. A shaft 113 with a roller 114 thereon is rotatably mounted on and between the ends of the arms 111 of the levers.

A pinion 115 is located over and in mesh with the continuously rotating gear 65 (see Fig. 4) and a pulley 116 is either formed integral with the pinion or permanently secured thereto. The pulley drives a belt 117 which passes around a second pulley 118 fixed on the end of the shaft 113, whereby it is evident the roller 114 is continuously driven and normally bears against the upper sides of boards fed into the machine to impel them to the rollers 19 and 34.

On the end of the shaft 81 a lever 119 is secured at a point between its ends, being formed with a part 120 which extends above the shaft 81 alongside the bar 67 so as to be in the path of movement of a pin 121 projecting laterally from the bar. A link bar 122 connects the lower end of the lever 119 with an arm 123 which is fixed to the rock shaft 109 at its upper end and extends downwardly to its point of connection to the link 122. When the bar 67 is given its longitudinal movement as the entering end of a board strikes the finger 86, pin 121 strikes against the part 120 to turn the lever 119 on the shaft 81 on which it is loosely mounted, this moving the link 122 for an operation of arm 123, thereby rocking the shaft 109 with a consequent elevation of the roller 114 above the board which lies beneath it. This operation appears in the showing of Fig. 11. The elevation of the roller 114 does not take place until after the end of the board has passed between the first rollers 19 and 34. Its release for return to lower position occurs with the release of the bar 67 as the board passes from over the finger 86, and in the meantime a succeeding board may have been started over the table 1 and be partly under the roller 114 which drops against it in time to move it to the said rollers 19 and 34, serving to force the same between said rollers, and help in the necessary elevation of the rollers 34 for the passage of the board.

The operator does not have to force entrance of the board between the rollers 19 and 34 as this entrance is automatically eftected by the roller 114, and said roller 114 is moved upwardly out of the way so as to permit the placing of succeeding boards in the machine without the necessity of forcing the elevation of the roller 114 against springs 112.

A movably mounted stop pin 125 normally held inwardly to the inner limit of its movement by a spring 124 is mounted on the front side of the supporting frame 3 to stop the movement of the arm 53 under the influence of spring 59. This insures against the movable cutter coming too close to the fixed cutter.

This construction of glue joiner machine is practical and has proved its merit in severe test. With it both side edges of a board may be dressed or shaped simultaneously ready for the application of glue and subsequent clamping together. The cutters may be of any preferred type so as to either plane the edges of the boards or to provide them with tongue and groove or other type of joint wanted. Any width of boards between the narrowest and the widest which the machine will take may be fed into the same and the cutters will automatically take the required positions with respect thereto and the movably mounted cutter will be automatically locked against movement away from the board until after the dressing of the edges thereof has been completed, the lock immediately thereafter becoming ineffective. The machine may be almost instantly changed for different thicknesses of boards. The construction is practical and complete in every way. The invention is defined in the appended claims and I consider myself entitled to all forms of structure coming within their scope.

I claim:

1. In a machine of the class described, a support, a feed and a delivery table carried thereby in alinement and spaced apart at their adjacent ends, driven feed rollers located between the tables, presser rollers associated with and located above the feed rollers, a relatively fixed rotatably mounted cutter located between the tables, a pivotally mounted arm on the support, a second cutter rotatably mounted on said arm, a bar connected to the arm extending laterally therefrom, a block through which the arm passes, a clamping member carried in the block and bearing against the bar, a screw for clamping said member against the bar, a gear rotatable with one of the feed rollers, a bar formed with a rack section thereon located adjacent the gear, a bar extending from the screw, connections between said two last mentioned bars, and means for elevating the rack bar into engagement with the gear operated by the passage of a board to the cutters, substantially as described.

2. A construction containing the elements in combination defined in claim 1, combined with means for freeing the rack bar from the gear when it has made a predetermined longitudinal movement sufficient to turn the said screw to clamping position, and means for holding the rack bar against return to its original position.

3. A construction containing the elements in combination defined in claim 1, combined with means for freeing the rack bar from the gear when it has made a predetermined longitudinal movement sufficient to turn the screw to clamping position, means for holding the rack bar against return to original position when freed from the gear, and means for moving said holding means to inoperative position on passage of the board past the cutters.

4. A machine of the class described, comprising a support, a feed and a delivery table carried by said support in alinement and spaced apart at adjacent ends, a plurality of feed rollers rotatably mounted between the ends of the tables, means for positively driving the rollers, a plurality of spring pressed presser rollers located one over each feed roller, a support for the presser rollers, an auxiliary feed roller carried by the last named support and located over the feed table in front and above the first feed rollers, spring means tending to force said auxiliary feed roller in a downward direction, means for elevating the auxiliary feed roller against the force of said spring means, cutters for dressing the edges of a board passed through the machine from the feed to the delivery table, and means extending above the plane of the tables into the path of movement of the board for operating said elevating means and holding the auxiliary feed roller elevated until the board has passed by said last mentioned means.

5. A machine of the class described, comprising a support, a feed and a delivery table carried by said support in alinement and spaced apart at adjacent ends, a plurality of feed rollers rotatably mounted between the ends of the tables, means for driving the feed rollers, a second support over the tables, a plurality of spring pressed rollers carried by the second support, one above each feed roller, a bracket extending from the second support over the feed table, a rock shaft mounted thereon, bell crank levers on the rock shaft, a shaft passing through one of the arms of each lever, a roller on the shaft, springs attached to the other arms of the levers tending to force the roller downwardly, means for driving the last mentioned roller, a shaft mounted transversely through the first support, a finger extending therefrom to between and above the tables, an arm connected to the rock shaft, a lever loosely mounted on the last named shaft, a link connecting the arm and lever, a gear connected with one of the feed rollers and rotating therewith, a rack bar, means for elevating the rack bar into engagement with the gear on depression of the finger, means for disconnecting the rack bar from the gear after it has moved longitudinally a predetermined distance, means for holding the rack bar in the position to which moved after disconnection from the gear, said means being freed on elevation of the finger, and means for operating the said last mentioned lever by the movement of the rack bar to elevate the auxiliary roller by rocking of the rock shaft and holding it elevated until the rack bar is released.

6. A construction containing the elements in combination defined in claim 5, combined with cutters for dressing the edges of a board passing from the feed table to the delivery table between the first feed and the presser rollers, said board serving to depress the said finger on reaching the same and release it for elevation on passing therefrom.

7. A construction containing the elements in combination defined in claim 5, combined with a relatively fixed rotatably mounted cutter and a movable rotatably mounted cutter, means to adjust the movable cutter to a distance away from the first cutter slightly less than the width of the board passed from the feed to the delivery table, and locking means operated by the movement of the rack bar to lock the movable cutter in fixed position until the rack bar is released, substantially as described.

8. In a machine of the class described, a feed and a delivery table located end to end and spaced apart at adjacent ends, a cutter mounted to turn on a vertical axis located between the tables and being relatively fixed against movement, an elongated supporting arm mounted at one end for pivotal movement on and under the delivery table and extending to between the tables, a second cutter rotatably mounted to turn on a vertical axis at the free end of the arm, spring means connected to the arm tending to move the second cutter toward the first cutter, a bar slidably mounted flush with the upper surface of the feed table at the inner end thereof, a rigid connection between said bar and the supporting arm at the free end of said arm, and a member secured to the upper side of said bar and located at an angle to the length of the feed table against which a board rides at one edge when fed to the cutters thereby automatically moving the second cutter to proper position with reference to the edge of the board, combined with a guide on the feed table for the opposite edge of said board.

9. In a machine of the class described, a support, a feed and a delivery table carried thereby in alignment and spaced apart at their adjacent ends, feed means for boards located at said adjacent ends of the table, a relatively fixed rotatably mounted cutter located between the tables, a second cutter movably mounted adjacent the first cutter, spring means tending to move said second cutter toward said first cutter, a bar slidably mounted transversely of the feed table, connections between said bar and the second cutter for moving the second cutter away from the first cutter on slidable movement of the bar in one direction, a member adjustably mounted on said bar and adapted to be engaged by one edge of the board as it is fed over the feed table, means on the feed table against which the opposite edge of the board bears whereby on movement of a board over the feed table said second cutter is moved away from the first cutter a distance depending upon the width of the board, and means mounted between the cutters engaged by the board as the same passes between the same and automatically operated thereby, combined with locking means associated with said movable cutters to automatically operate said locking means to lock the movable cutters against movement away from the board during the time that the board is passing between the cutters.

10. In a machine of the class described, a feed table and a delivery table having ends spaced apart, means mounted adjacent the adjacent ends of the table for carrying boards from the feed to the delivery table, a relatively fixed rotatably mounted cutter for dressing one edge of the different boards, a second rotatable cutter, a pivotally mounted arm on which the second cutter is mounted, said second cutter being adapted to dress the opposite edge of the board, a bar mounted transversely of and flush with the upper side of the feed table for slidable movements adjacent the feeding means, connections between said bar and the movable arm, means on said bar engaged by one edge of the board for slidably moving the bar when a board passes thereby, relatively fixed means on the feed table against which the opposite edge of the board bears, and means to lock said movable arm against movement away from the edge of the board after it has once been moved to proper position to dress said edge of the board, said means being automatically operated by the board as its front end reaches a position between the cutters, substantially as described.

In testimony whereof I affix my signature.

GLENN H. DICKERSON.